US012229254B2

(12) United States Patent
Kellermann et al.

(10) Patent No.: US 12,229,254 B2
(45) Date of Patent: Feb. 18, 2025

(54) MACHINE LEARNING FRAUD RESILIENCY USING PERCEPTUAL DESCRIPTORS

(71) Applicant: Intel Corporation, Santa Clara, CA (US)

(72) Inventors: Raizy Kellermann, Jerusalem (IL); Omer Ben-Shalom, Rishon le-Tzion (IL); Alex Nayshtut, Gan Yavne (IL)

(73) Assignee: INTEL CORPORATION, Santa Clara, CA (US)

( * ) Notice: Subject to any disclaimer, the term of this patent is extended or adjusted under 35 U.S.C. 154(b) by 357 days.

(21) Appl. No.: 17/560,943

(22) Filed: Dec. 23, 2021

(65) Prior Publication Data

US 2022/0114255 A1 Apr. 14, 2022

(51) Int. Cl.
*G06F 21/55* (2013.01)
*G06V 10/774* (2022.01)
*G06V 10/82* (2022.01)
*G06V 20/56* (2022.01)

(52) U.S. Cl.
CPC ........ *G06F 21/554* (2013.01); *G06V 10/7747* (2022.01); *G06V 10/82* (2022.01); *G06V 20/56* (2022.01)

(58) Field of Classification Search
CPC .. G06F 21/554; G06V 10/7747; G06V 10/82; G06V 20/56

See application file for complete search history.

(56) References Cited

U.S. PATENT DOCUMENTS

| | | | |
|---|---|---|---|
| 11,321,856 B1* | 5/2022 | Caldwell | G06T 7/40 |
| 11,443,531 B1* | 9/2022 | Saggu | G06V 10/764 |
| 2019/0007476 A1* | 1/2019 | Rabbat | H04N 21/44008 |
| 2020/0111364 A1* | 4/2020 | Damsaz | G08G 1/0962 |
| 2021/0014270 A1* | 1/2021 | Thakur | H04L 63/1425 |
| 2021/0056404 A1* | 2/2021 | Goswami | G06F 18/22 |
| 2021/0174132 A1* | 6/2021 | Mayes | G06V 20/647 |
| 2021/0232931 A1* | 7/2021 | Speakman | G06T 19/006 |
| 2021/0264268 A1* | 8/2021 | Goswami | G06N 3/08 |
| 2021/0295154 A1* | 9/2021 | Groh | G06V 10/82 |
| 2021/0309183 A1* | 10/2021 | Bielby | B60R 16/037 |

(Continued)

FOREIGN PATENT DOCUMENTS

WO WO-2021105985 A1 * 6/2021 ......... G06K 9/00791

*Primary Examiner* — Darshan I Dhruv
(74) *Attorney, Agent, or Firm* — JAFFERY WATSON HAMILTON & DESANCTIS LLP

(57) ABSTRACT

Machine learning fraud resiliency using perceptual descriptors is described. An example of a computer-readable storage medium includes instructions for accessing multiple examples in a training dataset for a classifier system; calculating one or more perceptual hashes for each of the examples; generating clusters of perceptual hashes for the multiple examples based on the calculation of the one or more perceptual hashes for each of the plurality of examples; obtaining an inference sample for classification by the classifier system; generating a first classification result for the inference sample utilizing a neural network classifier and generating a second classification result utilizing the generated clusters of perceptual hashes; comparing the first classification result with the second classification result; and, upon a determination that the first classification result does not match the second classification result, determining a suspicion of an adversarial attack.

18 Claims, 10 Drawing Sheets

(56) References Cited

U.S. PATENT DOCUMENTS

| | | | |
|---|---|---|---|
| 2022/0092351 A1* | 3/2022 | Huang | G06V 10/95 |
| 2022/0180173 A1* | 6/2022 | Jonnalagadda | A63F 13/35 |
| 2022/0277173 A1* | 9/2022 | He | G06N 3/0475 |
| 2023/0054186 A1* | 2/2023 | Messous | G06V 20/56 |
| 2023/0334332 A1* | 10/2023 | Wu | G06V 10/761 |

* cited by examiner

Clusters of Perceptual Hashes

MACHINE LEARNING FRAUD RESILIENCY USING PERCEPTUAL DESCRIPTORS

FIELD

This disclosure relates generally to the field of electronic devices and, more particularly, to machine learning fraud resiliency using perceptual descriptors.

BACKGROUND

Machine learning (ML) has been successfully applied in many different domains. In particular, deep learning (DL) classifiers in inference models have proven to provide very successful results in technical areas such as autonomous or assisted driving.

Unfortunately, machine learning based image recognition systems may be prone to misclassifications, due to both accidental and malicious crafted images. These images can cause the inference engine in a system to classify the images incorrectly. This can result in improper misbehavior of the image recognition system, which may have serious consequences. In the case of an autonomous or assisted driving system this can result in vehicle accidents and potential fatalities.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1A:
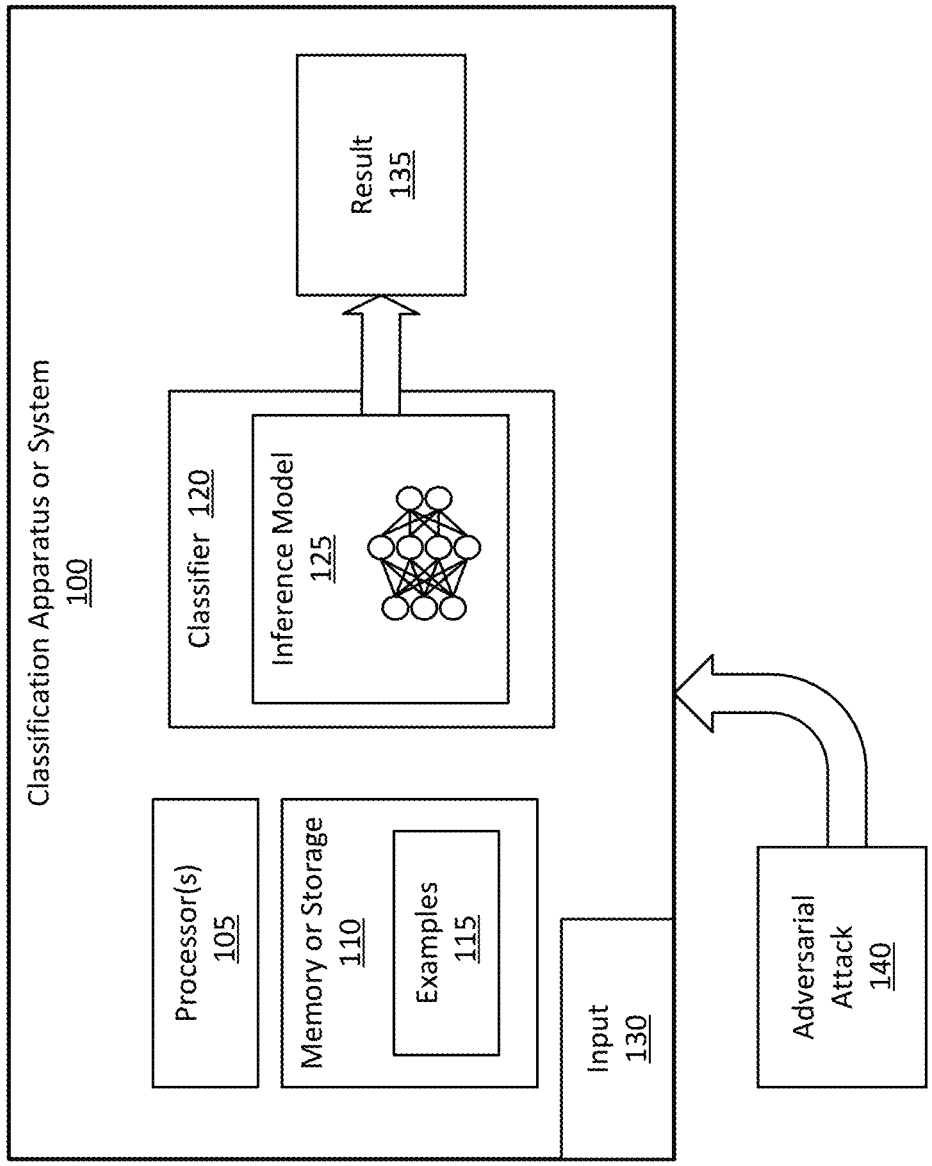
FIG. 1A illustrates an example of a machine learning classification system.

Embodiments described herein are directed to machine learning fraud resiliency using perceptual descriptors.

Such flaws may be weaponized by malicious actors to launch targeted attacks against specific cars or car manufactures.

Existing solutions to defend against adversarial sample attacks includes:

Adversarial training in which the training data is augmented with adversarial examples, with the training examples being labeled correctly. For example, in autonomous or assisted driving, an adversarial example that may resemble a traffic control device (such as traffic sign or signal) is labeled in a manner to indicate that the adversarial samples are not traffic control devices. As used herein, an autonomous driving apparatus or system generally refers to a vehicle apparatus or system that is capable of sensing the environment and moving safely with little or no human input, while an assisted driving apparatus or system refers to a vehicle apparatus or system that is capable of sensing the environment and assisting a human driver in driving the vehicle. As used herein, a vehicle includes any propelled vehicle, with or without a driver or passengers, including, but not limited to, an automobile; a truck; an airplane, helicopter, drone, or other flying vehicle; a boat, ship, or other watercraft; or a train locomotive or other rail vehicle.

Re-encoding the inputs to a classifier, such as using JPEG (Joint Photographic Experts Group) compression and decompression (or other coding format) to remove some of the visually undetectable noise; adding noise in overcome the perturbations; or semantic re-encoding in which semantic features are extracted and used for classification (which may be referred to as feature squeezing).

In attacks that require white-box access to the model (referring to access to the internal elements of the model, also known as clear box and other similar terms) to compute the adversarial examples according to the model gradients, a simple defense strategy is to limit access to the gradients, intentionally or unintentionally.

Post processing of activations or feature maps or use of explainability techniques to find anomalies in the classification patterns that were activated or produced by the network, compared to those generated for natural inputs.

However, adversarial training and other related solutions are expensive processes that lengthen the machine learning model training process and require additional compute resources. Further, this can degrade the performance compared to classifiers trained on natural data sets. Similarly, input reencoding adds overhead to the inference system, while being ineffective in many cases as an attacker can often overcome the deployed mechanism. Further, obfuscated gradients have been shown to be ineffective and can be bypassed by taking the expectation over randomness.

Limiting the access to the model's gradient does not work in many cases because many of the adversarial examples are transferable across independent models. Post processing or explainability techniques may add considerable runtime cost and commonly can only detect adversarial examples, while being incapable of classifying the adversarial examples correctly.

In some embodiments, an apparatus, system, or process provides for machine learning fraud resiliency using perceptual descriptors. In some embodiments, domain-specific adversarial examples are combatted by using a complementary, alternative classifier from a different machine learning paradigm. Specifically, clustered perceptual hashing is applied, which makes use of existing capabilities targeted to detect similar images to create novel feature descriptors.

Perceptual hashes may be viewed as fingerprints of a multimedia files that are derived from perceptual features of their contents, and are commonly utilized in detecting similar images or other data. In contrast with cryptographic hash functions, which rely on the avalanche effect of small changes in the input generate drastic changes in the output, perceptual hashes provide results that are "close" to one another if the features are similar.

In general, perceptual hashing is insensitive to rotations, translations, cropping and resizing of images, and also to more subtle properties such as slight colorization changes and changes inherited from digital re-encoding. Perceptual hash functions extract certain features from multimedia content and compute "perceptual equality" based on them. This technique is in particular used to determine the authenticity of multimedia files.

While perceptual hashing may in general be unsuitable for classification as objects from the same type can be captured in very perceptually different images, this technique is based on a very different concept than neural networks, and can be applied as another representation of knowledge regarding an image with a different type of classifier. In some embodiments, an operation is to combine two very different classification techniques—neural network classification and perceptual hash classification—and compare the results. If classification techniques disagree, this then generates a suspicion that an adversarial input has occurred. In some embodiments, an apparatus, system, or process then may take one or more actions in response to the suspicion of an adversarial input, such as generating an alert, recording data regarding the possible adversarial input, halting or changing operation of a mission critical operation (such as in an autonomous or assisted vehicle operation), or other appropriate response.

FIG. 1A illustrates an example of a machine learning classification system. As shown in FIG. 1A, a classification apparatus or system 100, which may include one or more processors 105, may receive examples 115 (shown as, for example, being stored in a memory or storage 110) for training of an inference model 125 of a classifier 120.

In this high level example, the classification apparatus or system 100 may receive data for classification at an input 130, with the classifier producing a result 135 that classifies the input pursuant to operation of the inference model 125. It is noted that FIG. 1A provides a high level example for illustration of the underlying concepts, and an apparatus or system will include numerous other elements, such as, for example, illustrated in a system as provided in FIG. 7.

Figure 1B:
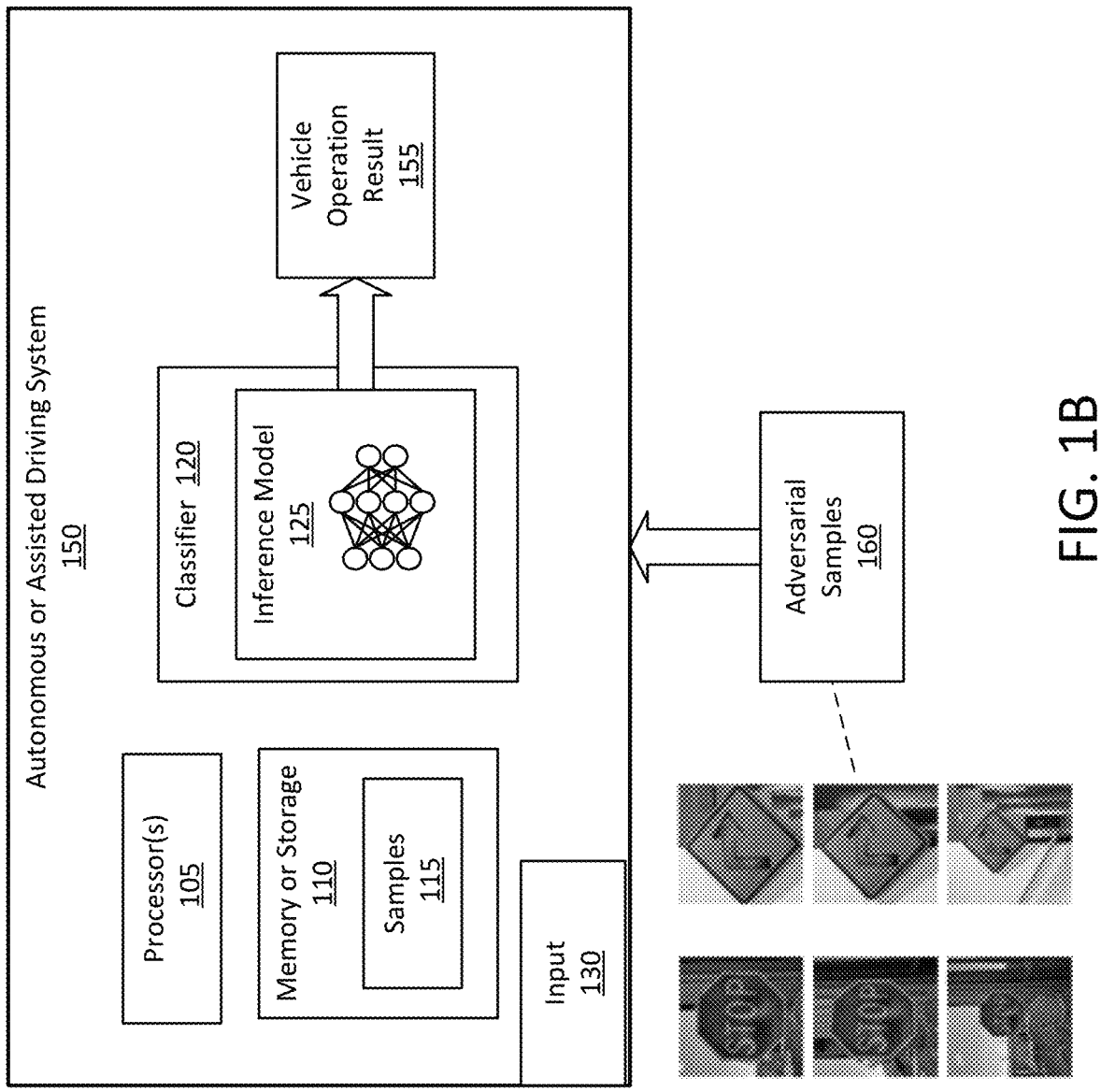
FIG. 1B illustrates an example of a machine learning classification system that is under an adversarial attack.

However, the classification apparatus or system 100 may be subject to an adversarial attack 140 based on input of adversarial examples that are provided in an attempt to cause the classifier 120 to generate an incorrect result. FIG. 1B illustrates an example of a machine learning classification system that is under an adversarial attack. As shown in FIG. 1B, a particular classification apparatus or system may include an autonomous or assisted driving system 150 that utilizes a classifier 120 to generate a vehicle operation result 155 (such as navigation, response to traffic control devices or hazards, or any other vehicle operation), which may include piloting a vehicle or otherwise affecting the operation of a vehicle based on the input data that is received.

In particular, the autonomous driving system 150 may have been receiving adversarial samples 160, which in this instance are adversarial traffic control device samples that have surreptitiously introduced by an attacking party to trick or spoof the system into producing incorrect vehicle operation results 155.

Figure 2:
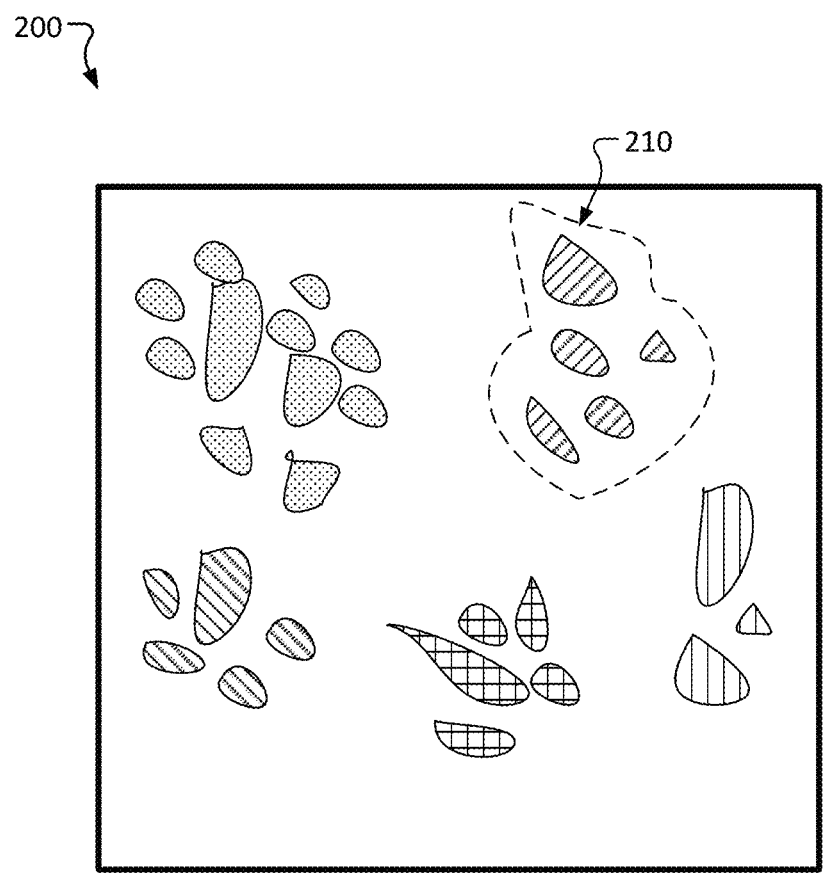
FIG. 2 illustrates a clusters of perceptual hashes that may be utilized in for machine learning fraud resiliency using perceptual descriptors.

FIG. 2 illustrates a clusters of perceptual hashes that may be utilized in for machine learning fraud resiliency using perceptual descriptors. As illustrated in FIG. 2, results of perceptual hashing computation may result in clusters of perceptual hashes 200, each cluster representing similar images (or other data input), with the values being similar because of the nature of a perceptual hash as a locality-sensitive hash that produces similar results if features of an input (such as multiple images) are similar.

For example, the clusters of perceptual hashes 200 includes a first cluster 210 that may represent hashes of a particular set of similar images. In some embodiments, an apparatus, system, or process is provided to mitigate a domain specific adversarial examples attack by measuring the distance to centroids of clusters (such as first cluster 210) that are computed over perceptual hashing descriptors. The perceptual clusters 200 are illustrated with different patterns to distinguish these from each other.

In some embodiments, perceptual hashing descriptors may be computed in advance on training examples and are clustered such that the number of the clusters (e.g. K in K-means) is the number of the target classes. (The number of clusters in the illustration provided in FIG. 2 is five, but this may be any integer number.)

In some embodiments, in order to provide better generalization, each descriptor is composed of several perceptual hashing algorithms, rather than a single algorithm. At runtime, each sample is associated to a cluster according to the centroid that is the shortest distance from sample.

However, if the target cluster's class is different than the classifier's decision, the sample is suspected as potentially being improper, which may include (but is not limited to) an adversarial sample. An embodiment may be applied against both targeted and untargeted attacks in order to significantly reduce the attack success rate.

Figure 3:
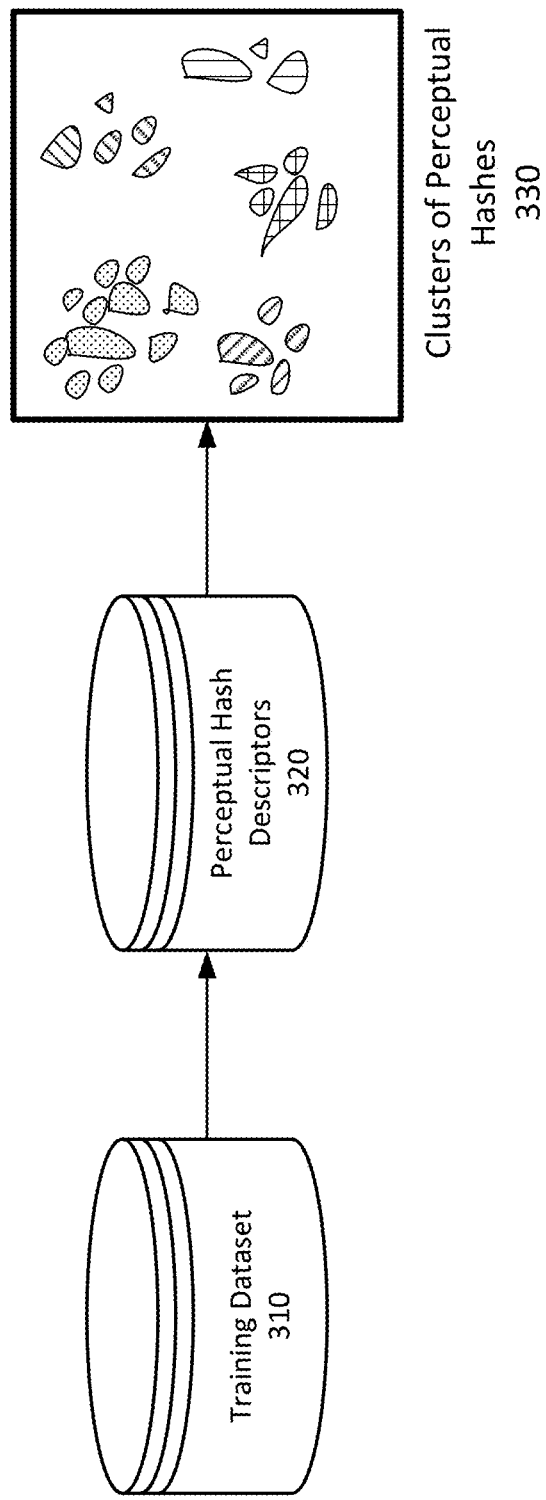
FIG. 3 illustrates perceptual hash descriptors in generation of clusters of perceptual hashes, according to some embodiments.

FIG. 3 illustrates perceptual hash descriptors in generation of clusters of perceptual hashes, according to some embodiments. FIG. 3 illustrates a training dataset 310, a database of perceptual hash descriptors 320 that are utilized in generating perceptual hashes and resulting clusters of perceptual hashes 330. The database of perceptual hash descriptors 320 includes multiple different algorithms that may be utilized together in the generation of perceptual hash values.

In some embodiments, a perceptual descriptor is computed for each of a set of samples (which may include all samples in a particular implementation) in the training dataset 310. The perceptual descriptor is composed of multiple perceptual hashing algorithms (which may be represented as a features vector), to gain more generalization. (In general, a features vector is an n-dimensional vector of numerical features that describe an object in pattern recognition,) In some embodiments, based on the perceptual hash descriptors 320 generated for the training samples 310, a set of perceptual clusters 330 is calculated. In some embodiments, the number of clusters is configurable, and the number of the clusters is set to the number of the target classes.

In some embodiments, the generation of clusters of perceptual hashes may be applied in the determination of adversarial suspicion.

Figure 4:
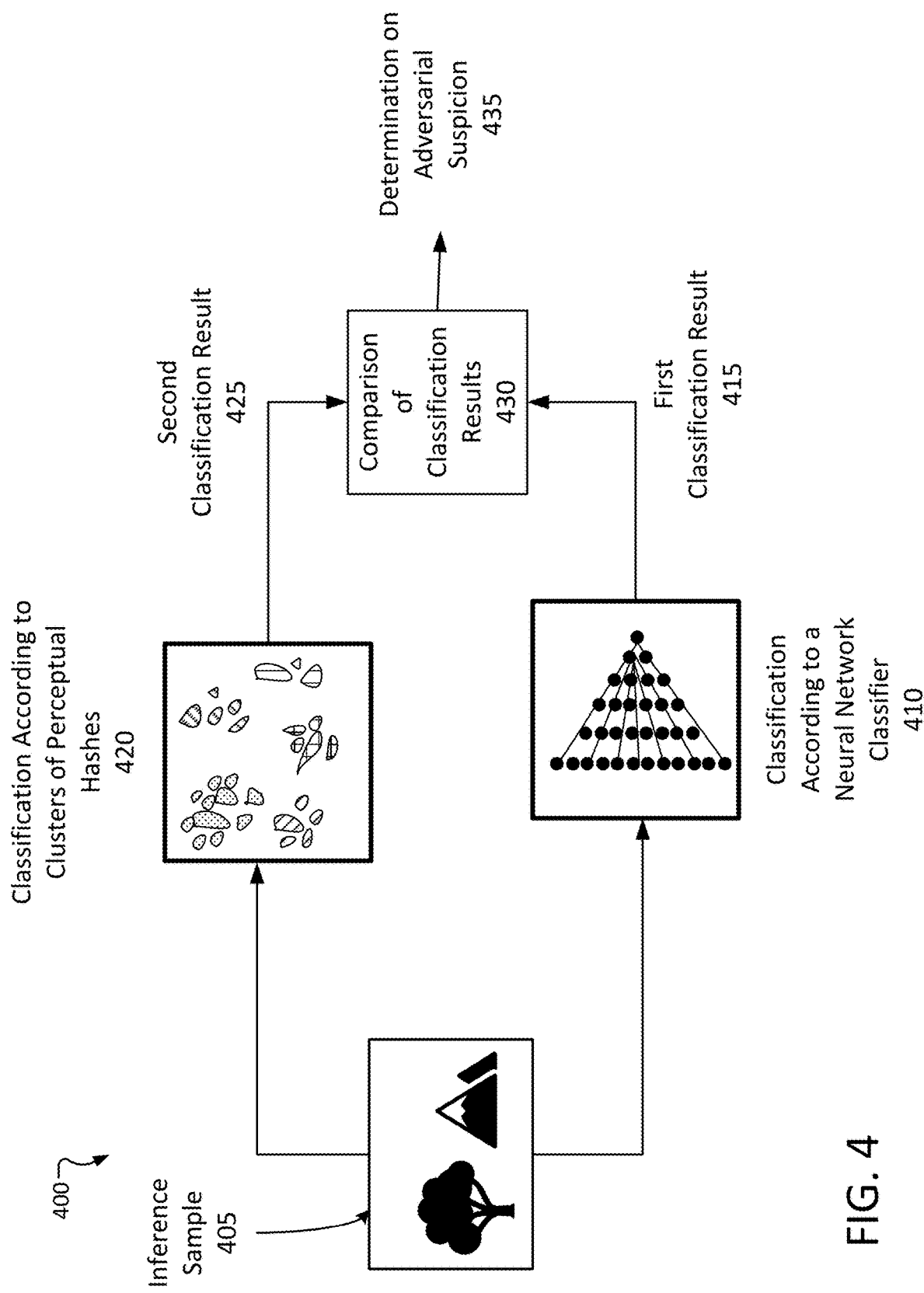
FIG. 4 is an illustration of an apparatus or system to identify adversarial attacks, according to some embodiments.

FIG. 4 is an illustration of an apparatus or system to identify adversarial attacks, according to some embodiments. An apparatus or system 400, such as the classification apparatus or system 100 illustrated in FIG. 1A or the autonomous or assisted driving system 150 illustrated in FIG. 1B, may receive an inference sample 405, which may include a particular image for classification.

In some embodiments, the inference sample is directed to multiple classifiers for purpose of detection of a possible adversarial sample. In a particular embodiment, both classification according to neural network classifier 410, such as illustrated in FIGS. 1A and 1B, to generate a first classification result 415, and classification according to clusters of perceptual hashes 420, such as illustrated in FIG. 3, to generate a second classification result 425.

In some embodiments, the apparatus or system 400 further includes comparison 430 of the first classification result 415 and the second classification result 425. For example, the comparison 430 may include comparing a class of the inference sample 405 as determined by the neural network classifier 410 with a class for the inference sample 405 as determined by the clusters of the perceptual hashes 420. Based on the comparison 430 the apparatus or system is to generate a determination whether there is a suspicion that an adversarial attack has occurred 435.

Figure 5:
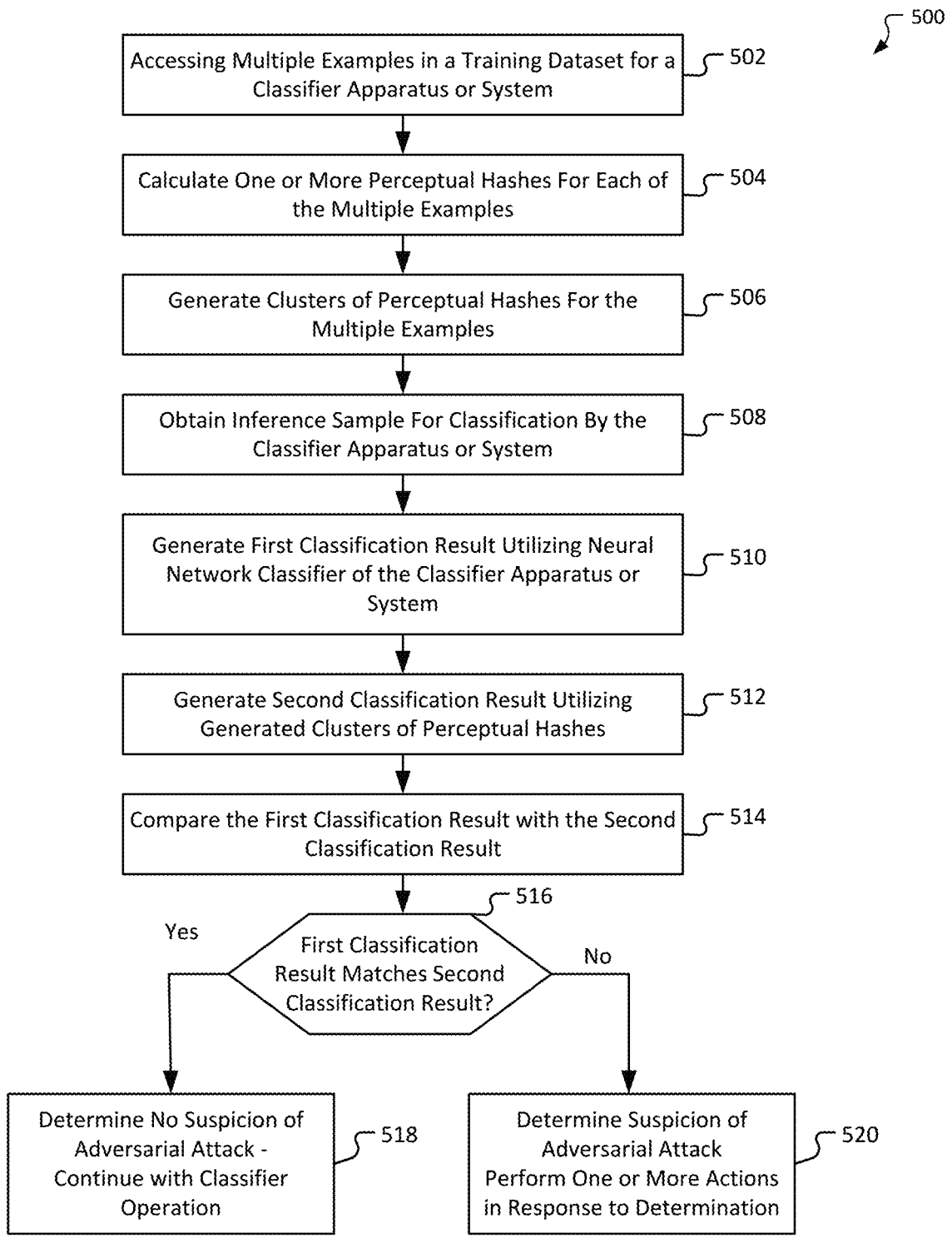
FIG. 5 is a flowchart to illustrate a process for machine learning fraud resiliency using perceptual descriptors, according to some embodiments.

FIG. 5 is a flowchart to illustrate a process for machine learning fraud resiliency using perceptual descriptors, according to some embodiments. In some embodiments, a process 500 includes accessing multiple examples in a training dataset for a classifier apparatus or system 502, such as examples in the training dataset 310 in FIG. 3. One or more perceptual hashes are calculated for each of the multiple examples 504, and clusters of perceptual hashes are generated for the multiple examples 506.

In some embodiments, an inference sample (such as inference sample 405 in FIG. 4) is obtained for classification by the classifier apparatus or system 508. In some embodiments, multiple classifications are computed for the inference sample to enable comparison for machine learning fraud resiliency. In a particular embodiment, a first classification result is generated utilizing a neural network classifier of the classifier apparatus or system 510 and a second classification result is generated utilizing the generated clusters of perceptual hashes 512.

In some embodiments, the first classification result is compared with the second classification result 514. (The comparison may include a larger comparison if more than two classifiers are utilized in the apparatus or system.) Upon a determination that the first classification result matches the second classification result 516, then a determination may be made that there is currently no suspicion of an adversarial attack, and the process 500 may continue with the classifier operation 518. However, upon a determination that the first classification result does not match the second classification result 518, then a determination may be made that there is a suspicion of an adversarial attack, and the process 500 may continue with one or more actions in response to the adversarial attack determination 520. In some embodiments, the one or more actions may include generating an alert, recording data regarding the possible adversarial input, halting or changing operation of a mission critical operation (such as in an autonomous or assisted vehicle operation), or other appropriate response.

Figure 6A:
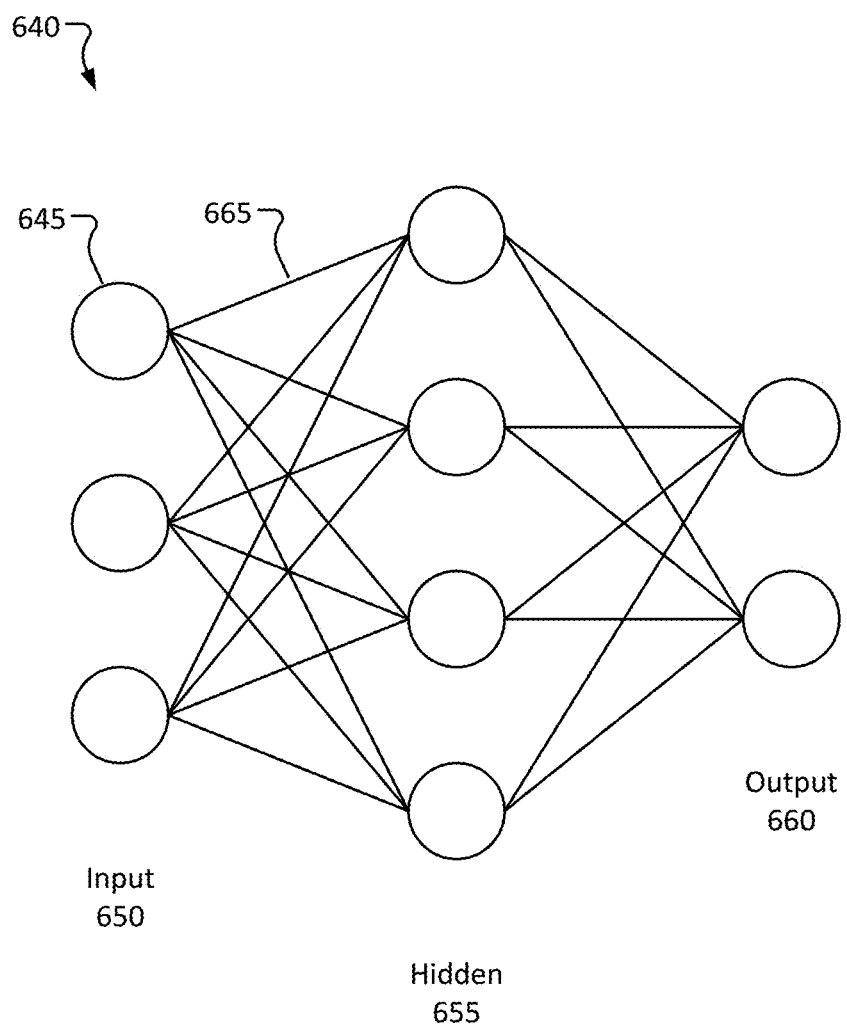
FIG. 6A is an illustration of a neural network that may be utilized in connection with machine learning fraud resiliency using perceptual descriptors according to some embodiments.

FIG. 6A is an illustration of a neural network that may be utilized in connection with machine learning fraud resiliency using perceptual descriptors according to some embodiments. As illustrated in FIG. 6A, a neural network 640, such as neural network in a classifier apparatus or system, includes a collection of connected units or nodes 645, also referred to as artificial neurons. Typically, nodes are arranged in multiple layers. Different layers may perform different transformations on their inputs. In this simplified illustration the neural network includes the nodes in layers that include an input layer 650, one or more hidden layers 655, and an output layer 660. Each connection (or edge) 665 can transmit a signal to other nodes 645. A node 645 that receives a signal may then process it and signal nodes connected to it. The nodes and edges typically have a weight that adjusts as learning proceeds.

Neural networks, including feedforward networks, CNNs (Convolutional Neural Networks, and RNNs (Recurrent Neural Networks) networks, may be used to perform deep learning. Deep learning refers to machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 6B:
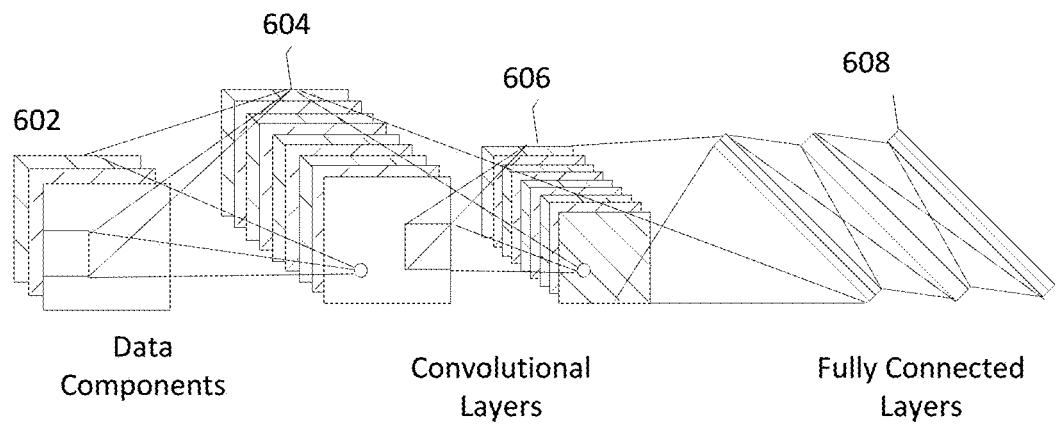
FIGS. 6B and 6C illustrate an example of a neural network that may be processed, according to some embodiments.
Figure 6C:
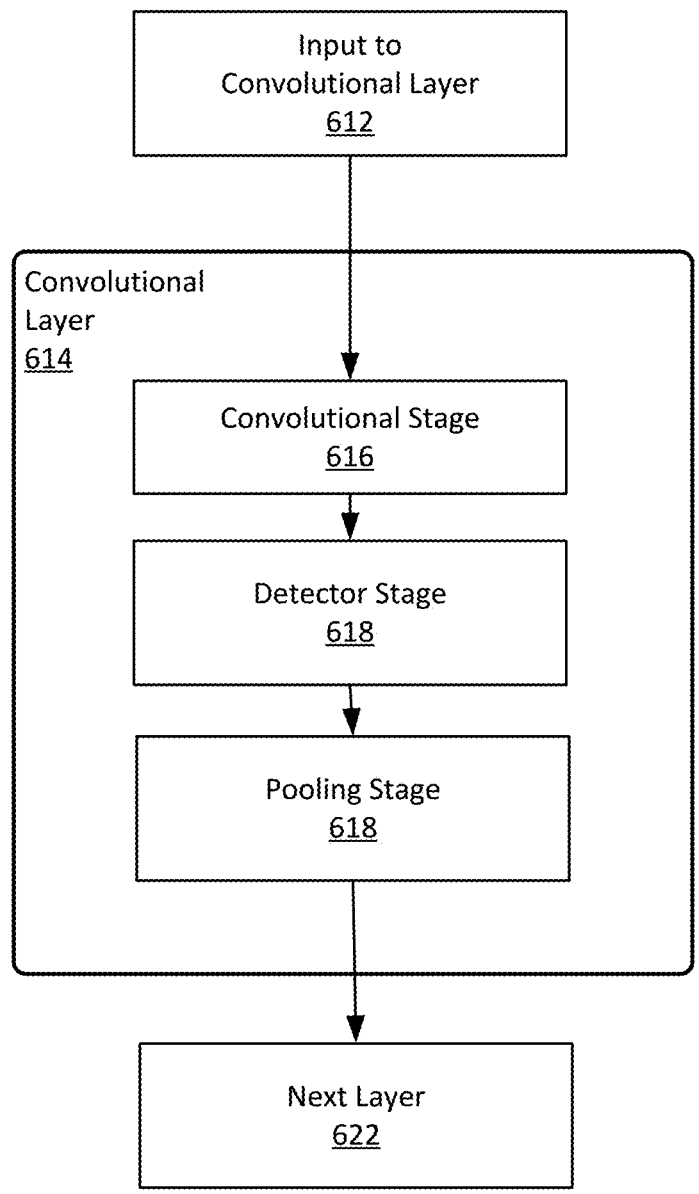

FIGS. 6B and 6C illustrate an example of a neural network that may be processed, according to some embodiments. FIG. 6B illustrates various layers within a CNN as a specific neural network example. However, embodiments are not limited to a particular type of neural network. As shown in FIG. 6B, an exemplary neural network used to, for example, model image processing can receive input 602 describing, for example, the red, green, and blue (RGB) components of an input image (or any other relevant data for processing). The input 602 can be processed in this example by multiple convolutional layers (e.g., convolutional layer 604 and convolutional layer 606). The output from the multiple convolutional layers may optionally be processed by a set of fully connected layers 608. Neurons in a fully connected layer have full connections to all activations in the previous layer, as previously described for a feedforward network. The output from the fully connected layers 608 can be used to generate an output result from the network. The activations within the fully connected layers 608 can be computed using matrix multiplication instead of convolution. Not all CNN implementations make use of fully connected layers 608. For example, in some implementations the convolutional layer 606 can generate output for the CNN.

FIG. 6C illustrates exemplary computation stages within a convolutional layer of a CNN. Input to a convolutional layer 612 of a CNN can be processed in three stages of a convolutional layer 614. The three stages can include a convolution stage 616, a detector stage 618, and a pooling stage 620. The convolution layer 614 can then output data to a successive convolutional layer 622. The final convolutional layer of the network can generate output feature map data or provide input to a fully connected layer, for example, to generate a classification value for the input to the CNN.

In the convolution stage 616 several convolutions may be performed in parallel to produce a set of linear activations. The convolution stage 616 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 616 defines a set of linear activations that are processed by successive stages of the convolutional layer 614.

The linear activations can be processed by a detector stage 618. In the detector stage 618, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined such that the activation is thresholded at zero.

The pooling stage 620 uses a pooling function that replaces the output of the convolutional layer 606 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 620, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 614 can then be processed by the next layer 622. The next layer 622 can be an additional convolutional layer or one of the fully connected layers 608. For example, the first convolutional layer 604 of FIG. 6B can output to the second convolutional layer 606, while the second convolutional layer can output to a first layer of the fully connected layers 608.

Figure 7:
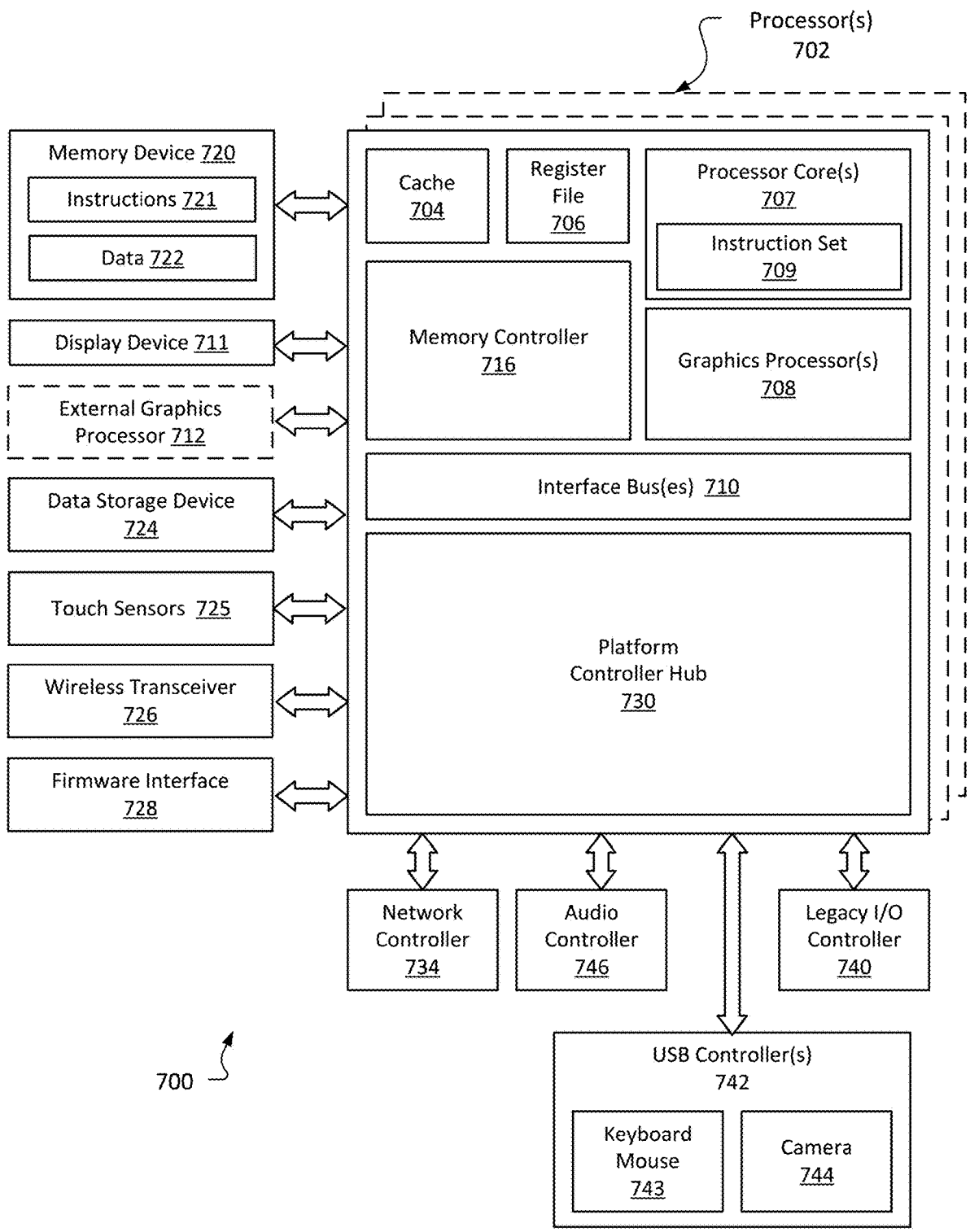
FIG. 7 illustrates an embodiment of an exemplary computing architecture for connectionless trusted computing base recovery, according to some embodiments.

FIG. 7 illustrates an embodiment of an exemplary computing architecture for machine learning fraud resiliency using perceptual descriptors, according to some embodiments. In various embodiments as described above, a computing architecture 700 may be implemented or be implemented as part of an electronic device. In some embodiments, the computing architecture 700 may be representative, for example, of a computer system that implements one or more components of the operating environments described above. The computing architecture 700 may be utilized to provide machine learning fraud resiliency using perceptual descriptors, such as described in FIGS. 1A-5.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In one embodiment, the system 700 is a processing platform incorporated within a system-on-a-chip (SoC or SOC) integrated circuit for use in mobile, handheld, or embedded devices.

An embodiment of system 700 can include, or be incorporated within, a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory 704 is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, non-volatile memory device such as flash memory device or phase-change memory device, or some other memory device having suitable performance to serve as process memory. Memory device 720 may further include non-volatile memory elements for storage of firmware. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device, or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

The following Examples pertain to certain embodiments:

In Example 1, one or more non-transitory computer-readable storage mediums have stored thereon executable computer program instructions for accessing a plurality of examples in a training dataset for a classifier system; calculating one or more perceptual hashes for each of the plurality of examples; generating clusters of perceptual hashes for the plurality of examples based on the calculation of the one or more perceptual hashes for each of the plurality of examples; obtaining an inference sample for classification by the classifier system; generating a first classification result for the inference sample utilizing a neural network classifier and generating a second classification result utilizing the generated clusters of perceptual hashes; comparing the first classification result with the second classification result; and upon a determination that the first classification result does not match the second classification result, determining a suspicion of an adversarial attack.

In Example 2, calculating one or more perceptual hashes includes calculating a plurality of perceptual hashes for each of the plurality of examples, the plurality of perceptual hashes including a plurality of perceptual hash algorithms.

In Example 3, the instructions further include instructions for, upon a determination that the first classification result does not match the second classification result, performing one or more actions in response to the determination of suspicion of an adversarial attack.

In Example 4, the one or more actions include one or more of generating an alert; recording data regarding a possible adversarial input; and halting or changing an operation of the classifier system.

In Example 5, the inference sample is an image.

In Example 6, the classifier system is a classifier for an autonomous driving vehicle or an assisted driving vehicle.

In Example 7, the suspicion of an adversarial attack includes a suspicion that one or more adversarial examples have been received for training of the classifier system.

In Example 8, a method includes accessing a plurality of examples in a training dataset for a classifier system; calculating one or more perceptual hashes for each of the plurality of examples; generating clusters of perceptual hashes for the plurality of examples based on the calculation of the one or more perceptual hashes for each of the plurality of examples; obtaining an inference sample for classification by the classifier system; generating a first classification result for the inference sample utilizing a neural network classifier and generating a second classification result utilizing the generated clusters of perceptual hashes; comparing the first classification result with the second classification result; and, upon a determination that the first classification result does not match the second classification result, determining a suspicion of an adversarial attack.

In Example 9, calculating one or more perceptual hashes includes calculating a plurality of perceptual hashes for each of the plurality of examples, the plurality of perceptual hashes including a plurality of perceptual hash algorithms.

In Example 10, the method includes, upon a determination that the first classification result does not match the second classification result, performing one or more actions in response to the determination of suspicion of an adversarial attack.

In Example 11, the one or more actions include one or more of generating an alert; recording data regarding a possible adversarial input; and halting or changing an operation of the classifier system.

In Example 12, the inference sample is an image.

In Example 13, the classifier system is a classifier for an autonomous driving vehicle or an assisted driving vehicle.

In Example 14, the suspicion of an adversarial attack includes a suspicion that one or more adversarial examples have been received for training of the classifier system.

In Example 15, an apparatus includes one or more processors to process data including data classification of inference samples; and a storage for storing data including a training dataset of samples; wherein the one or more processors are to access a plurality of examples in the training dataset; calculate a plurality of perceptual hashes for each of the plurality of examples; generate clusters of perceptual hashes for the plurality of examples based on the calculation of the one or more perceptual hashes for each of the plurality of examples; obtain an inference sample for classification by the apparatus; generate a first classification result for the inference sample utilizing a neural network classifier and generate a second classification result utilizing the generated clusters of perceptual hashes; compare the first classification result with the second classification result; and, upon a determination that the first classification result does not match the second classification result, determine a suspicion of an adversarial attack.

In Example 16, the one or more processors are further to, upon a determination that the first classification result does not match the second classification result, perform one or more actions in response to the determination of suspicion of an adversarial attack.

In Example 17, the one or more actions include one or more of generating an alert; recording data regarding a possible adversarial input; and halting or changing an operation of the classifier system.

In Example 18, the inference sample is an image.

In Example 19, the apparatus includes a classifier for an autonomous driving vehicle or an assisted driving vehicle.

In Example 20, the suspicion of an adversarial attack includes a suspicion that one or more adversarial examples have been received for training of the classifier system.

In Example 21, an apparatus includes means for accessing a plurality of examples in a training dataset for a classifier system; means for calculating one or more perceptual hashes for each of the plurality of examples; means for generating clusters of perceptual hashes for the plurality of examples based on the calculation of the one or more perceptual hashes for each of the plurality of examples; means for obtaining an inference sample for classification by the classifier system; means for generating a first classification result for the inference sample utilizing a neural network classifier and generating a second classification result utilizing the generated clusters of perceptual hashes; means for comparing the first classification result with the second classification result; and means for determining a suspicion of an adversarial attack upon a determination that the first classification result does not match the second classification result.

In Example 22, the means for calculating one or more perceptual hashes includes means for calculating a plurality of perceptual hashes for each of the plurality of examples, the plurality of perceptual hashes including a plurality of perceptual hash algorithms.

In Example 23, the apparatus further includes means for performing one or more actions in response to the determination of suspicion of an adversarial attack upon a determination that the first classification result does not match the second classification result.

In Example 24, the one or more actions include one or more of generating an alert; recording data regarding a possible adversarial input; and halting or changing an operation of the classifier system.

In Example 25, the inference sample is an image.

In Example 26, the classifier system is a classifier for an autonomous driving vehicle or an assisted driving vehicle.

In Example 27, the suspicion of an adversarial attack includes a suspicion that one or more adversarial examples have been received for training of the classifier system.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. One or more non-transitory computer-readable storage mediums having stored thereon executable computer program instructions that, when executed by one or more processors, cause the one or more processors to perform operations comprising:
   accessing a plurality of examples in a training dataset for a classifier system;
   calculating a plurality of perceptual hashes for each of the plurality of examples, the plurality of perceptual hashes including a plurality of perceptual hash algorithms;
   generating clusters of perceptual hashes for the plurality of examples based on the calculation of the plurality of perceptual hashes for each of the plurality of examples;
   obtaining an inference sample for classification by the classifier system;
   generating a first classification result for the inference sample utilizing a neural network classifier and generating a second classification result for the inference sample utilizing the generated clusters of perceptual hashes;
   comparing the first classification result for the inference sample with the second classification result for the inference sample; and
   upon a determination that the first classification result does not match the second classification result, determining a suspicion of an adversarial attack on the classifier system.

2. The storage mediums of claim 1, wherein the instructions further include instructions for:
   upon the determination that the first classification result does not match the second classification result, performing one or more actions in response to the determination of suspicion of an adversarial attack.

3. The storage mediums of claim 2, wherein the one or more actions include one or more of:
   generating an alert;
   recording data regarding a possible adversarial input; and
   halting or changing an operation of the classifier system.

4. The storage mediums of claim 1, wherein the inference sample is an image.

5. The storage mediums of claim 1, wherein the classifier system is a classifier for an autonomous driving vehicle or an assisted driving vehicle.

6. The storage mediums of claim 1, wherein the suspicion of an adversarial attack includes a suspicion that one or more adversarial examples have been received for training of the classifier system.

7. A method comprising:
   accessing a plurality of examples in a training dataset for a classifier system;
   calculating a plurality of perceptual hashes for each of the plurality of examples, the plurality of perceptual hashes including a plurality of perceptual hash algorithms;
   generating clusters of perceptual hashes for the plurality of examples based on the calculation of the plurality of perceptual hashes for each of the plurality of examples;
   obtaining an inference sample for classification by the classifier system;
   generating a first classification result for the inference sample utilizing a neural network classifier and generating a second classification result for the inference sample utilizing the generated clusters of perceptual hashes;
   comparing the first classification result for the inference sample with the second classification result for the inference sample; and
   upon a determination that the first classification result does not match the second classification result, determining a suspicion of an adversarial attack on the classifier system.

8. The method of claim 7, further comprising:
   upon the determination that the first classification result does not match the second classification result, performing one or more actions in response to the determination of suspicion of an adversarial attack.

9. The method of claim 8, wherein the one or more actions include one or more of:
   generating an alert;
   recording data regarding a possible adversarial input; and
   halting or changing an operation of the classifier system.

10. The method of claim 7, wherein the inference sample is an image.

11. The method of claim 7, wherein the classifier system is a classifier for an autonomous driving vehicle or an assisted driving vehicle.

12. The method of claim 7, wherein the suspicion of an adversarial attack includes a suspicion that one or more adversarial examples have been received for training of the classifier system.

13. An apparatus comprising:
   one or more processors to process data including data classification of inference samples; and
   a storage for storing data including a training dataset of samples;
   wherein the one or more processors are to:
      access a plurality of examples in the training dataset;
      calculate a plurality of perceptual hashes for each of the plurality of examples, the plurality of perceptual hashes including a plurality of perceptual hash algorithms;
      generate clusters of perceptual hashes for the plurality of examples based on the calculation of the plurality of perceptual hashes for each of the plurality of examples;
      obtain an inference sample for classification by the apparatus;
      generate a first classification result for the inference sample utilizing a neural network classifier and generate a second classification result for the inference sample utilizing the generated clusters of perceptual hashes;
      compare the first classification result for the inference sample with the second classification result for the inference sample; and
      upon a determination that the first classification result does not match the second classification result, determine a suspicion of an adversarial attack on the apparatus.

14. The apparatus of claim 13, wherein the one or more processors are further to:

upon the determination that the first classification result does not match the second classification result, perform one or more actions in response to the determination of suspicion of an adversarial attack.

15. The apparatus of claim 14, wherein the one or more actions include one or more of:
generating an alert;
recording data regarding a possible adversarial input; and
halting or changing an operation of the apparatus.

16. The apparatus of claim 13, wherein the inference sample is an image.

17. The apparatus of claim 13, wherein the apparatus includes a classifier for an autonomous driving vehicle or an assisted driving vehicle.

18. The apparatus of claim 13, wherein the suspicion of an adversarial attack includes a suspicion that one or more adversarial examples have been received for training of the apparatus.

* * * * *